(12) United States Patent
Jordan et al.

(10) Patent No.: US 6,205,134 B1
(45) Date of Patent: *Mar. 20, 2001

(54) VOICE PROCESSING SYSTEM

(75) Inventors: Robert Michael Jordan, Winchester; Andrew Ritchie, Eastleigh, both of (GB)

(73) Assignee: International Business Machines Corp., Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/914,739

(22) Filed: Aug. 19, 1997

(30) Foreign Application Priority Data

Feb. 19, 1997 (GB) .................................... 9703433

(51) Int. Cl.[7] ............................. H04L 12/66; H04B 7/212
(52) U.S. Cl. ...................... 370/352; 370/347; 370/395; 370/442
(58) Field of Search ................................. 370/347, 356, 370/352, 395, 419, 442, 257, 398, 467, 392; 329/399, 339, 93.09; 710/100

(56) References Cited

U.S. PATENT DOCUMENTS

| 5,440,616 | 8/1995 | Harrington et al. | 379/88.27 |
| 5,526,353 | * 6/1996 | Henley et al. | 370/392 |
| 5,546,392 | * 8/1996 | Boal et al. | 370/395 |
| 5,615,211 | * 3/1997 | Santore et al. | 370/419 |
| 5,719,858 | * 2/1998 | Moore | 370/347 |
| 5,805,588 | * 9/1998 | Petersen | 370/356 |
| 5,862,136 | * 1/1999 | Irwin | 370/395 |
| 5,864,542 | * 1/1999 | Gupta et al. | 370/257 |
| 6,081,519 | * 6/2000 | Petler | 370/356 |

FOREIGN PATENT DOCUMENTS

| 2293519 | 3/1996 | (GB) | H04M/3/50 |
| 2301978 | 12/1996 | (GB) | H04M/3/50 |
| WO96/42164 | 12/1996 | (WO) | H04M/3/50 |

* cited by examiner

Primary Examiner—Hassan Kizou
Assistant Examiner—John Pezzlo
(74) Attorney, Agent, or Firm—Jerry W. Herndon

(57) ABSTRACT

A voice processing system is attached to a switch via an ATM link, the switch being in turn attached to the telephone network. The voice processing system handles incoming or outgoing calls transmitted over the ATM link, which supports a plurality of virtual connections. The voice processing system includes a time division multiplex (TDM) bus having multiple timeslots, and an adapter card for attachment to the ATM link for transferring data between a virtual connection on the ATM link and one or more timeslots on the TDM bus.

19 Claims, 5 Drawing Sheets

VOICE PROCESSING SYSTEM

BACKGROUND OF THE INVENTION

The present invention relates to voice processing systems, and in particular to the manner in which such voice processing systems may be attached to a switch via an ATM link.

Voice processing systems are well-known (see for example "Voice Processing" by Walt Teschner, published by Artech House), and are used to perform a variety of tasks, for example voice mail (also known as voice messaging), whereby callers who cannot reach their intended target can instead record a message for subsequent retrieval, and interactive voice response (IVR), in which callers interact with the voice processing system, typically by means of pressing DTMF keys, in order to obtain particular information.

Many other technologies are being incorporated into voice processing systems, such as voice recognition, text-to-speech, FAX, and so on. Furthermore, voice processing systems are now being considered for use as general media servers, for use for example in playing out video streams over the telephone network (or other appropriate network).

The simplest voice processing systems have as their input a conventional analog telephone line, in other words, they can plug into a socket in place of a normal telephone line. Multiple lines can be used if necessary, but this approach still has a very limited call capacity. Therefore more sophisticated voice processing systems have a digital trunk connection, either to a switch or directly into the digital telephone network. Such voice processing systems are often installed at the sites of customers who have relatively large volumes of incoming or outgoing telephone calls and therefore have their own switch. Thus the voice processing systems makes or receives telephone calls through the switch over one or more digital telephone lines.

Modern telephony signals are generally transmitted in digital form using standard 8-bit samples at a rate of 8 kHz, thereby requiring an overall bandwidth of 64 kilobits per second (kbps). The nature of the audio signals is such that an essentially logarithmic quantisation provides the best representation of the original analog input in the amplitude domain. Two quantisation laws in particular are widely used: A law in Europe and mu law in North America. These are defined in recommendation G.711 of the CCITT "Yellow Books" (now the ITU).

To allow large volumes of telephone traffic to be handled simply, individual signals are time multiplexed together for transmission over digital trunk lines. In North America, the standard form of trunk line is known as T1 (also referred to as DS1), and provides 24 simultaneous lines. These trunk lines can be used not only to carry the actual audio telephone signal, but also to provide a limited degree of signalling information, for example, to reserve a channel, to make a call on a channel, to transfer a call, and so on. In Europe, the standard form of trunk line is known as E1, and provides 32 simultaneous lines (of which 30 are for telephony channels, one for framing, and one for signalling).

Voice processing systems typically utilise such T1/E1 trunks as their telephony connection, either to a switch, or directly to the telephone network. This requires specialised telephony hardware, known as a line interface unit, capable of interfacing to the T1/E1 trunk, for performing multiplexing/demultiplexing, DTMF detection, signalling, and so on. The line interface unit can either be provided in the form of an adapter card within the voice processing system, or as a separate unit.

An example of a voice processing system which uses a separate unit to interface to a T1/E1 trunk is the DirectTalk/6000 system, available from IBM Corporation. This product is described in the manual "AIX DirectTalk/6000 General Information and Planning" (GC33-1720-00), also available from IBM, along with the other manuals listed therein.

FIG. 1 is an illustration of a DirectTalk/6000 system installation, including a switch 22 and DirectTalk/6000 voice processing system 60. The switch is connected by multiple T1 trunk lines 15 to the telephone network 10 (it is assumed that this installation is in North America, so that T1 lines are used, but it will be appreciated that the same configuration could be adopted also in Europe, using E1 trunk Lines).

The voice processing system 60 comprises two main components, a host processor 45, which for the DirectTalk/6000 system is a RISC System/6000 computer, and a set of one or more line interface units 25. The DirectTalk/6000 system supports a couple of different possible line interface units, but the one illustrated is known as a SPACK. This comprises two cards, a trunk interface card 30 which is connected to the switch by a T1 link 20, and a base card 35 which is connected to a corresponding adapter card 50 in the RISC System/6000 via link 40 (which is proprietary). The switch 22 also typically includes a card (not shown) to terminate the T1 link 20. Each SPACK can handle 24 telephony channels (ie the number of channels in a single T1 trunk). To support higher numbers of telephony channels, it is necessary to use additional SPACKs (shown schematically as 25A). Each of these has its own T1 link 20A with the switch, and link 40A to a corresponding digital trunk adapter card 50A in the RISC System/6000 computer. Signalling can be exchanged between the switch 22 and the voice processing system 60 either over the T1 link 20, or via a separate connection (not shown).

Note that dual digital trunk adapter cards are available from IBM, which can be used instead of two separate digital trunk adapter cards in the RISC System/6000 (ie two SPACKs can connect to a single dual digital trunk adapter card). The dual digital trunk adapter card fits into the same slot as a single digital trunk adapter card.

In the DirectTalk/6000 system, the SPACKs are provided in one or more digital trunk processor units 80. A single digital trunk processor contains one SPACK and one power supply, whilst a multiple digital trunk processor contains up to five SPACKs plus two power supplies (one is for backup purposes). The DirectTalk/6000 system can process up to 120 telephony channels, corresponding to 5 SPACKs (ie one multiple digital trunk processor). Since a RISC System/6000 computer can only contain three digital trunk adapter cards, it is necessary to use at least two dual digital trunk adapter cards in order to support 5 SPACKs (together with either a single digital trunk adapter card, or another dual digital trunk adapter card).

Thus the telephony connections between the switch and the voice processing system are somewhat complex. Moreover, as computers become increasingly powerful, the number of telephony channels that they can process continues to grow. Thus it is now possible for a voice response unit (VRU), an IVR voice processing system, to handle 10 E1/T1 trunk lines, corresponding to up to 300 telephony channels (for E1). For the configuration of FIG. 1, this would then require 10 cards in the switch and 10 line interface units for the voice processing system, representing a very significant hardware cost. It is potentially possible to reduce costs by the use of dual or quad interface cards, which can interface to two or four T1/E1 trunk lines respectively (similar in concept to the use of the dual digital trunk adapter), but these are still expensive.

Alternatively, it might be possible to use a T3 connection between the switch and the voice processing system. A T3 connection comprises 28 T1 trunks effectively bundled together into a single link, and so provides for a very large number of simultaneous channels between the switch and the voice processing system. However, hardware to support such a T3 interface for a voice processing interface is not commercially available at present, and even if available, such hardware would be very specialised, and hence expensive.

It will be appreciated that many voice processing systems have a somewhat different architecture from that shown in FIG. 1. Typically these are built around an internal time division multiplex (TDM) bus, in which each telephony channel that is being handled by the system is allocated a timeslot on the TDM bus. The main TDM bus types commercially used in voice processing systems are the PCM Expansion bus (PEB), supporting up to 128 64 kbps TDM timeslots, and the SCbus, supporting up to 2048 64 kbps timeslots, both from Dialogic Corporation, and the MVIP bus, defined by the GO-MVIP organisation, and available from Natural Microsystems Corporation and others, supporting up to 512 64 kbps timeslots. In such voice processing systems, the line interface unit is effectively incorporated into the host computer, such that the functionality of the SPACK and the digital trunk adapter of FIG. 1 are essentially combined into a single adapter card. Whilst this approach is simpler in terms of hardware requirements, there are often restrictions on overall call handling capacity, due to physical limitations on the number of adapter cards that can be incorporated into the host computer. Of course, these restrictions can be overcome by using multiple voice processing systems, but this again increases complexity and costs.

Another possibility, since switches themselves are typically built around a TDM bus, is to try to effectively provide a direct extension from the TDM bus of the switch through to the TDM bus of the voice processing system. For example, an SCxbus is available from Dialogic Corporation for bridging between two buses conforming to the above-mentioned SCbus architecture. However, this requires the switch to conform to (or at least be able to interface to) the particular bus architecture of the voice processing system. Moreover, such bus extensions sometimes have limitations on length, thereby restricting the relative physical locations of the switch and the voice processing system.

A somewhat different approach to linking a switch to a voice processing system is disclosed in WO 96/42164. This teaches a system in which the switch is connected to the voice processing system by a standard data connection, such as a SCSI link, an ATM link, etc (see FIG. 7 of this document and associated description). The purpose of this arrangement is to avoid duplicating telephony processing hardware in both the switch and the voice processing line interface unit.

In general, as the demand for voice processing function increases, systems must be able to simultaneously handle increasing numbers of telephony channels. This puts the interface between the switch and an attached voice processing system (or systems) under ever greater strain.

SUMMARY OF THE INVENTION

Accordingly, the invention provides a voice processing system for handling calls incoming or outgoing over an ATM link attached to a switch and supporting a plurality of virtual connections, said voice processing system comprising:

a time division multiplex (TDM) bus having multiple timeslots; and adapter means for attachment to the ATM link for transferring data between a virtual connection on the ATM link and one or more timeslots on the TDM bus.

The mapping between virtual connections from an ATM link and timeslots on the voice processing system TDM bus provides a simple but highly efficient mechanism for transmitting data between the switch and the voice processing system. It will be appreciated that such data will typically be normal voice or FAX telephony data, but the voice processing system may also be designed to handle other forms of data, such as video. This approach significantly reduces hardware complexity as compared to the prior art, thereby offering the potential of important cost savings.

In one embodiment, each virtual connection is pre-assigned to one or more timeslots on the TDM bus. This approach is simple, but relatively inflexible. Alternatively, a virtual connection may be assigned to said one or more timeslots on the TDM bus responsive to each call. (Note that since a standard telephone voice channel is normally duplex, whereas virtual connections and timeslots are generally uni-directional, a voice call is usually actually associated with a pair of timeslots and a pair of virtual connections, one for incoming data and one for outgoing data).

The voice processing system preferably includes means for exchanging call signalling information with the switch. In one preferred embodiment, there is an additional link separate from the ATM link over which this signalling information is exchanged. The advantage of this approach is that such signalling systems are already available in some voice processing systems and switches. Alternatively, the signalling information may be exchanged over the ATM link itself, which in some ways is a neater solution, but does require additional software support on the adapter means.

In one preferred embodiment, the plurality of virtual connections comprise permanent virtual connections (PVCs), which are pre-configured. This approach is relatively simple, since it does not require any ATM signalling software, although it may be rather inflexible. Alternatively, the plurality of virtual connections may comprise switched virtual connections (SVCs), wherein the virtual channels are set up on a per call basis. This approach is particularly suited to situations where the bandwidth required per call is variable, since it is then possible to set up the virtual channels accordingly. Such a facility is especially useful where the voice processing system includes means for transmitting and/or receiving a FAX, integrated voice/data or video signal (or any other higher bandwidth signal) via said ATM link.

The invention further provides a method for handling calls in a voice processing system, said calls incoming or outgoing over an ATM link attached to a switch and supporting a plurality of virtual connections, comprising the steps of:

receiving incoming telephony data from said calls from a virtual connection on said ATM link;

transferring said incoming telephony data onto a time division multiplex (TDM) bus having multiple timeslots;

generating outgoing telephony data for said calls;

placing said outgoing telephony data onto a timeslot on the TDM bus; and transferring said outgoing telephony data from said timeslot on the TDM bus onto a virtual connection on the ATM link.

Preferably the method further comprises the initial steps of: receiving an incoming telephony call at said switch; and selecting one or more virtual connections over said ATM link between the switch and the voice processing system; wherein said incoming and outgoing telephony data are transferred over said selected one or more virtual connections. Analogous steps would be performed for initiating an outbound call.

In one preferred embodiment, said step of selecting a virtual connection comprises the steps of:

determining at the switch one or more available virtual connections for use for the incoming call from a set of permanent virtual connections between the switch and the voice processing system; and transmitting the identity of each determined virtual connection from the switch to the voice processing system.

Further in this preferred embodiment, the identity of each determined virtual connection is transmitted from the switch to the voice processing system as a channel and trunk identifier over a signalling link separate from said ATM link in accordance with a standard signalling protocol, and the voice processing system performs a mapping between the channel and trunk identifier supplied in accordance with the standard signalling protocol and the determined virtual connection. This allows the switch and the voice processing system to exchange signalling information using an already defined and available signalling process, with the mapping process performing the conversion between the channel and trunk identifiers of the signalling process and the virtual connection on the ATM link.

The invention further provides a voice processing installation for handling incoming and/or outgoing calls, comprising:

a switch;

a plurality of voice processing systems, each attached to said switch by a respective ATM link supporting a plurality of virtual connections between the switch and the voice processing system;

wherein each voice processing system further comprises a time division multiplex (TDM) bus having multiple timeslots; and adapter means for attachment to the respective ATM link for transferring data between a virtual connection on the ATM link and one or more timeslots on the TDM bus.

Such an installation, comprising multiple voice processing machines, is capable of processing a very large number of telephony calls. Each voice processing machine is attached to the switch by a respective ATM link, in any appropriate manner as described above.

BRIEF DESCRIPTION OF THE DRAWINGS

Preferred embodiments of the invention will now be described in detail by way of example only. The following drawings are included herewith.

DETAILED DESCRIPTION

Figure 2:
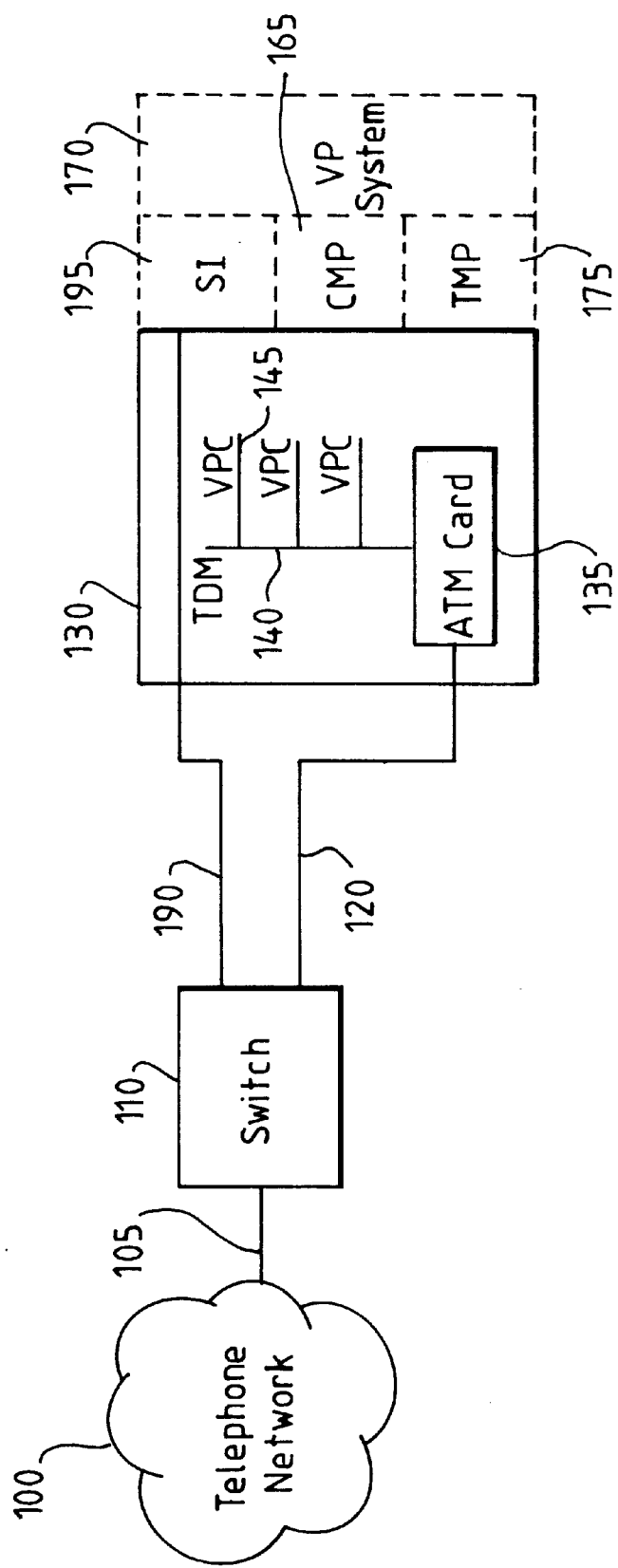
FIG. 2 illustrates a first preferred embodiment of the invention, whereby a voice processing system is connected to a switch by an ATM link using PVCs, and also by a dedicated signalling link.

FIG. 2 illustrates a first preferred embodiment of the invention. Again, a switch 110 is connected via lines 105 into the telephone network 100. It will be appreciated that as before, switch 110 may in fact be an integral part of the network itself (eg functioning as a central office). The switch is attached via an ATM (asynchronous transfer mode) link 120 to a voice processing system 130. An ATM connection, can provide near-real-time bi-directional communications, and so is well-suited to voice telephony. Typical ATM links have a bandwidth of either 25 Mbps or 155 Mbps, allowing support for many simultaneous telephony channels. For example, a 25 Mbps link could support over 300 telephony channels (each of 64 kbps). In addition, there is a separate signalling link 190 between the switch 110 and the voice processing system 130.

An ATM virtual connection (also known as a virtual circuit) is normally defined by a virtual path and a virtual channel, where a virtual path can contain multiple virtual channels. Typically, virtual paths are set up at configuration time on a permanent or semipermanent basis. ATM virtual connections can be established either as permanent virtual connections (PVCs), or as switched virtual connections (SVCs). In the former case, the virtual paths and channels are predetermined, such that each new connection is simply allocated to an appropriate virtual channel along a virtual path. In the latter case, the virtual channels are established with each connection. This solution is somewhat more flexible, but also more complicated because of the signalling involved, and so may be more expensive and slower. Further details about ATM can be found in "An Introduction to ATM Technology", by Boisseau, Demange, and Munier, International Thomson Publishing, 1995 (ISBN 1-850-32140-x). The embodiment of FIG. 2 uses PVCs which are set up at install or configuration time to provide multiple 64 kbps connections over the ATM link 120. The PVCs can be subsequently reconfigured, but not on a call by call basis.

Voice processing system 130 is shown schematically in simplified form in FIG. 2, with the solid items representing specific hardware components, and the dashed lines representing software components. The architecture of voice processing system 130 is based around a time division multiplex (TDM) bus 140. It will be appreciated that voice processing systems having a TDM bus architecture are very well known in the industry.

As a point of detail, it will be noted that both TDM timeslots and ATM virtual connections are both generally uni-directional. Therefore, since telephony channels are normally duplex, each telephony channel typically requires a pair of timeslots (one for Transmit, and one for Receive), and/or a pair of virtual connections. However, to simplify the present description, we shall generally refer simply to a virtual connection or timeslot for the call, and this should be interpreted as representing an incoming/outgoing pair as appropriate. Further matching a timeslot to a virtual connection typically therefore represents matching an outbound timeslot and virtual connection, and also matching a corresponding inbound timeslot and virtual connection.

Attached to the TDM bus are one or more voice processing cards 145 to perform desired voice processing functions, such as voice response, voice recognition, text to speech, FAX transmission and receipt, and so on. Suitable voice processing cards are widely available in the industry; note that the voice processing cards 145 need to be compatible with the TDM bus type, PEB, MVIP, SCBus, or whatever. As explained in more detail below, these boards are also required to perform call progress detection, compression/decompression, and DTMF detection/generation.

The other hardware component of voice processing system 130 is an ATM adapter card 135, which serves the purpose of exchanging data between the TDM bus 140 and the ATM link 120. This card generally occupies just a single slot in voice processing system 130. A suitable card for performing this function is the Artemis card, available from InnoMediaLogic (IML), of Quebec, Canada, for either an MVIP or SCBus TDM bus architecture. The Artemis cards are described in more detail in "ArTeMis Application Notes" from IML Inc, version 1.0, March 1996, which is incorporated herein by reference.

The software components of the voice processing system 130 shown schematically in FIG. 2 by dotted lines include a signalling interface 195, which is adapted to whatever signalling protocol is received from the switch via link 190. There is also a call manager component 165, which effectively decides how calls will be processed and which maintains a record of activity on the ATM link, and a timeslot manager component 175 which controls allocation of timeslots on the TDM bus. In addition, there is the main voice processing software 170 running on the machine, whilst the voice processing cards will be running further software (not shown) as appropriate. The voice processing software 170 will generally be under the control of a particular application (not shown), and will interface to and invoke the signalling interface 195, the call manager component 165, and the timeslot manager program 175 as required, as well as the software routines running on the voice processing cards 145.

It will be noted that the use of an ATM link 120 and ATM adapter card 135 significantly reduces hardware complexity, not least in terms of the number of hardware components required, since only a single adapter card 135 is required to handle the interface between the voice processing system 130 and the switch 110. This single card can be accommodated relatively easily in the host processor unit of the voice processing system 130, obviating the need for the separate line interface unit (component 25 in FIG. 1). This reduction in hardware complexity reduces the cost of the voice processing system 130 compared to the voice processing system 60 of FIG. 1.

Figure 1:
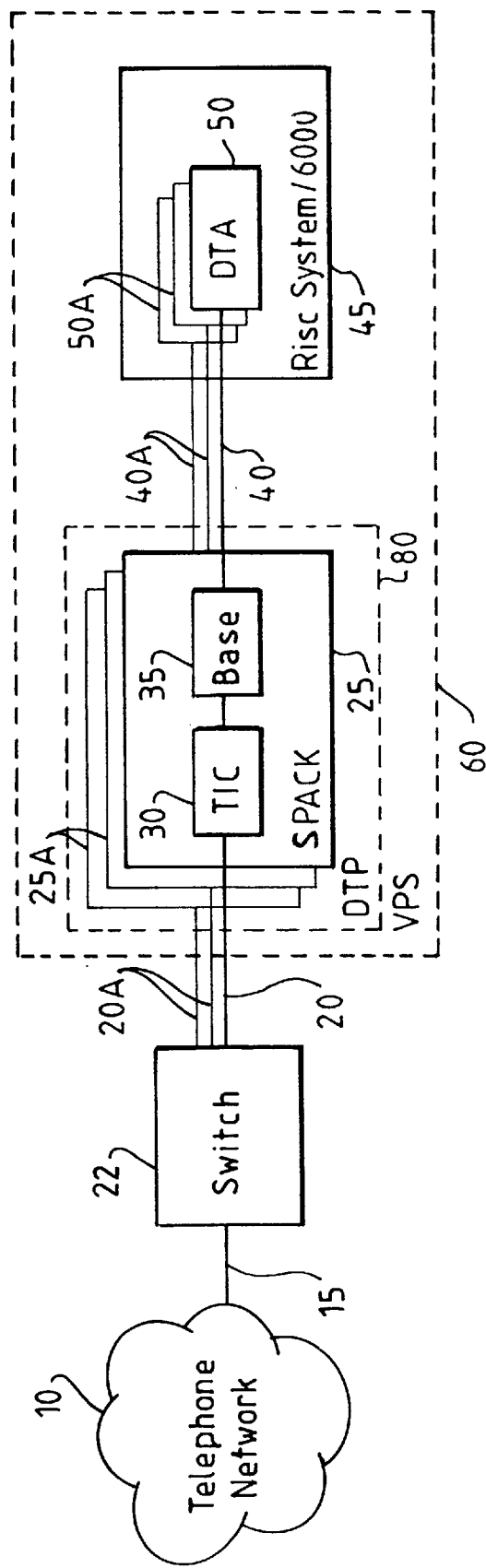
FIG. 1 illustrates a prior art installation whereby a voice processing system is connected to a switch by a specialised telephony link.

Note that the functions previously performed by the digital trunk interface and the digital trunk adapter of FIG. 1 are assigned as follows in the embodiment of FIG. 2. The ATM adapter card performs the multiplexing and de-multiplexing of calls over the link 120 between the switch and the voice processing system, and makes the telephony data in these calls available to the voice processing components in the system 130. Responsibility for DTMF recognition is most conveniently transferred onto the voice processing cards 145, since these typically include digital signal processing resources which are well-suited to executing the DTMF recognition algorithms. Similarly, the voice processing cards are also responsible for the recognition of call progress tones, for the generation of DTMF tones if required, and for any necessary compression and/or decompression of incoming/outgoing voice signals. Finally, as discussed in more detail below, signalling between the switch 110 and the voice processing system 130 can be performed by a variety of mechanisms.

The configuration shown in FIG. 2 also requires modification to the switch 110 as well as to the voice processing system 130 in order to be able to support the ATM link 120. Since a typical switch is based on a TDM architecture, this can be achieved in a similar manner as for the voice processing system, ie the provision of a suitable adapter card to exchange data between timeslots on the TDM bus and circuits on the ATM link. Alternatively, switch 110 may itself be an ATM switch (perhaps with link 105 representing an ATM connection into the telephone network 100), in which case the switch will automatically have support for ATM link 120.

The signalling link 190 between the switch 110 and the voice processing unit 130 is well-known in the art, and can conform to a standard protocol such as ISDN User Part (ISUP) SS7. Alternatively, various switch specific signalling protocols are also available for use over this connection, for example an ACL link for a Hicom switch from Siemens, an ASAI link for a Definity switch from AT&T Corporation, or an SMSI link also from AT&T Corporation. Note that most signalling protocols, and also the internal processing of voice processing software 170, are generally based on using channel and trunk identifications. For example SS7 provides a 12-bit Circuit Identification Code (CIC) in the Signalling Information Field, which normally specifies the channel number using the least significant 5 bits, and the trunk number using the remaining 7 bits. Therefore both the switch and the voice processing system maintain a mapping between virtual connections over the ATM link 120 and trunk/channel numbers.

An example of a possible mapping is given in Table 1 below between SS7 CIC, and Virtual Path Identifier (VPI)/Virtual Channel Identifier (VPI/VCI), which identify a virtual connection. In this example, it is assumed that a single virtual path is defined for the ATM link 120, and that this is VPI 1. A range of VCIs is reserved for voice streams inbound to the voice processing platform (VCI 1 to VCI 1024) and a distinct range is reserved for voice streams outbound from the voice processing platform (VCI 1025 to 2048).

TABLE 1

| CIC (binary) | VCI/CPI (decimal) | E1 Trk/CHl equiv |
|---|---|---|
| 00000001 | 1/1 & 1/1024 | 1/1 |
| 00000010 | 1/2 & 1/1025 | 1/2 |
| 00000011 | 1/3 & 1/1026 | 1/3 |
| ... | ... | ... |
| 00100001 | 1/31/ & 1/1054 | 2/1 |
| ... | ... | ... |

(Note that Table 1 provides a sample mapping for E1 trunks, because the relationship between CIC and trunk and channel numbers is well-defined according to an ITU standard; by contrast, for T1 trunks, this relationship is privately agreed between interoperating carriers. Nevertheless, the same principle applies in both cases).

The operation of the system of FIG. 2 will now be discussed. It is assumed that a call arrives at the switch 110, to be forwarded to the voice processing system 130, typically because of the particular telephone number dialled by the caller. In response to the arrival of the call, the switch allocates a virtual connection to the telephony channel associated with the call, and signals to the voice processing system over link 190 that a call has been received, informing it of the identity of the virtual connection (strictly pair of virtual connections) allocated to that call. This requires the switch to use the mapping between the channel definitions of the signalling protocol, and the virtual paths on the ATM link 120. Other information may also be transmitted over the signalling link to the voice processing system 130 from the switch 110, such as ANI/DNIS information.

The signalling information is passed from the signalling interface 195 to the call manager component 165, which is responsible for interacting with the timeslot manager program 175 to obtain a vacant timeslot for the incoming call on the TDM bus. The identity of this timeslot, plus the ATM virtual circuit information, is passed from the call manager to the ATM adapter card 135. The call manager can also assign a particular voice processing card 145 to handle the call, based perhaps on ANI/DNIS information, or perhaps simple availability, informing the card of the assigned timeslot on the TDM bus. The call manager 165 then responds to the switch via the signalling interface 195 to accept the call, whereupon the switch connects the incoming call to the indicated virtual connection on ATM link 120. The ATM adapter card therefore recognises the incoming signal on ATM link 120, and transfers the signal to the appropriate timeslot on the TDM bus 140, from where it is extracted and processed by the assigned voice processing card 145.

It will be appreciated that the details of the above processing are very flexible. For example, the virtual connection identifier may be explicitly supplied to the voice response unit by the switch, either before or after call acceptance (dependent on the particular signalling protocol being used). Further, the ATM adapter card may interact directly with the timeslot manager program to obtain a suitable timeslot, which it then identifies to the call manager program. Similarly, the application may itself interact with the timeslot manager program (possibly through voice processing software 170), rather than the call manager program and timeslot manager communicating directly with each other. Also, the call manager program may specifically ask the application before deciding whether or not to accept the call. Changes such as these do not impact the overall principles of operation of the system.

Another variation on the processing described above is where the ATM adapter card is pre-configured such that the PVCs are allocated to predetermined timeslots on the TDM bus. In other words, a call on a particular PVC is always assigned to the same timeslot on the TDM bus. This in turn would allow a direct mapping from the switch channel definitions into the TDM bus timeslots. This approach is simpler in operation, since now the operation of the ATM card is largely automatic; ie it routes all incoming calls onto their pre-allocated timeslots. However, this approach has somewhat reduced flexibility compared to the dynamic timeslot allocation of the preferred embodiment.

The processing described above has concentrated on the handling of incoming calls, but the system of FIG. 2 can equally well be used for outgoing calls. Typically such an outgoing call would be initiated by the voice processing system 170 or application thereon passing a request to the call manager component 165. The call manager first of all selects an available virtual connection to be used for this call (strictly speaking a pair of virtual connections, one incoming, one outgoing), based on its knowledge of the virtual connections that are already allocated to other inbound or outbound calls, and then exchanges messages with the switch via the signalling interface 195 and link 190 to set up the outbound call to a desired telephone number (either internal or external) over this selected virtual connection (this requires the voice processing system to again use mapping information such as presented in Table 1 above). At the same time, and assuming that timeslots can be dynamically allocated to virtual connections, the call manager interacts with the time slot manager 175 to select an available time slot (again, strictly speaking, a pair of timeslots) for the call. The call manager then instructs the ATM adapter card to associate the selected time slot with the selected virtual connection, as specified by a virtual path identifier and a virtual channel identifier. Therefore, once notification has been received from the switch that the call has been answered, the call manager informs the application of the relevant timeslot for the call, thereby allowing the application to access the outgoing call. The ATM adapter card then routes data from the selected time slot onto the selected virtual connection over the ATM link to the switch, and the switch routes the data from the selected virtual connection onto an outgoing line to the desired telephone number, and vice versa for incoming telephony data.

Although not specifically described above, the skilled person would appreciate that additional signalling between the switch and the call manager program occurs at the conclusion of each telephone call. This allows both devices to maintain accurate records of which virtual connections are available to be used for new calls. Likewise, the timeslot manager maintains a record of which timeslots on the TDM bus are currently available to be used for new calls.

Figure 3:
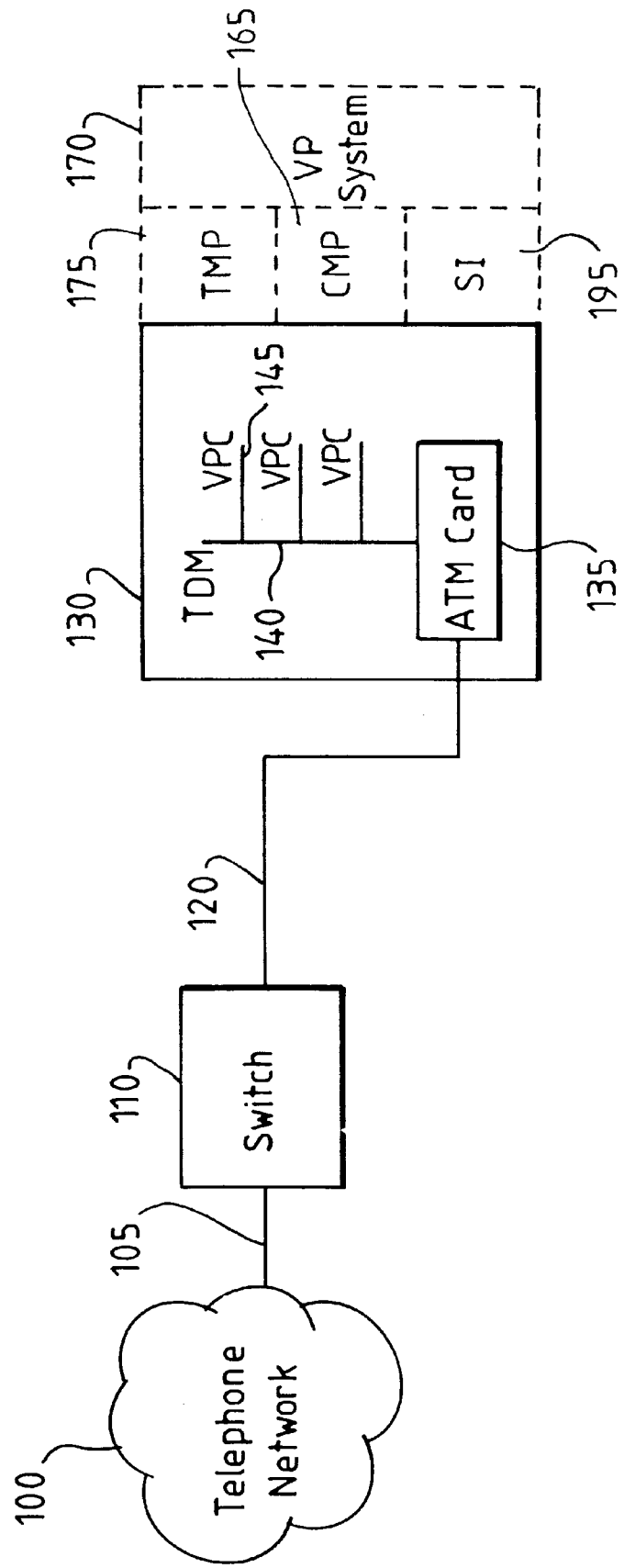
FIG. 3 illustrates a second preferred embodiment of the invention, whereby a voice processing system is connected to a switch by an ATM link, using PVCs and a signalling connection defined within one of the PVCs.

FIG. 3 illustrates a second preferred embodiment of the invention, in which like components from FIG. 2 have retained the same reference numerals. In this embodiment, there is no longer a separate dedicated signalling link between the switch and the voice processing system. Instead, the signalling required for call handling is performed over the ATM link itself. Note that this embodiment still uses PVCs so that the signalling relates to the telephony calls themselves, rather than ATM network signalling (indeed, the signalling itself is performed over a predefined permanent virtual connection). Thus it may be possible to use one of the call signalling protocols mentioned earlier, but using the ATM link as the physical data connection, rather than having two separate links inbetween the switch and the voice processing system. Again, the switch and the voice processing system will generally need to have appropriate software and data in the signalling interface in order to map inbetween the virtual connections on the ATM link, and the channel and trunk numbers of conventional signalling protocols.

One of the software components required in order to support ATM communications is known as the ATM adaption layer (AAL). There are several versions of the AAL, according to the type of data being processed. The transmission of conventional voice data as per FIG. 2 requires so-called AAL 1 on the ATM adapter card 135. The transmission of signalling data in the embodiment of FIG. 3 requires so-called AAL 5, which supports standard data communications (AAL 5 would be required in addition to the AAL 1 needed for the voice data ). It will be noted that the currently available Artemis card from IML referred to above has only AAL 1 support at present, but IML have announced a new ArTeMux card which does provide such AAL 5 support (see URL http://www.imlcti.com/Products.htm). (In fact the Artemis card does already provide a limited data exchange capability for signalling by using AAL 0).

The operation of the embodiment of FIG. 3 is similar to that for FIG. 2, except that the signalling interface now interacts with the communications software running on the ATM adapter card in order to exchange signalling information with the switch. Other than that, the operation of these two embodiments is substantially the same.

Figure 4:
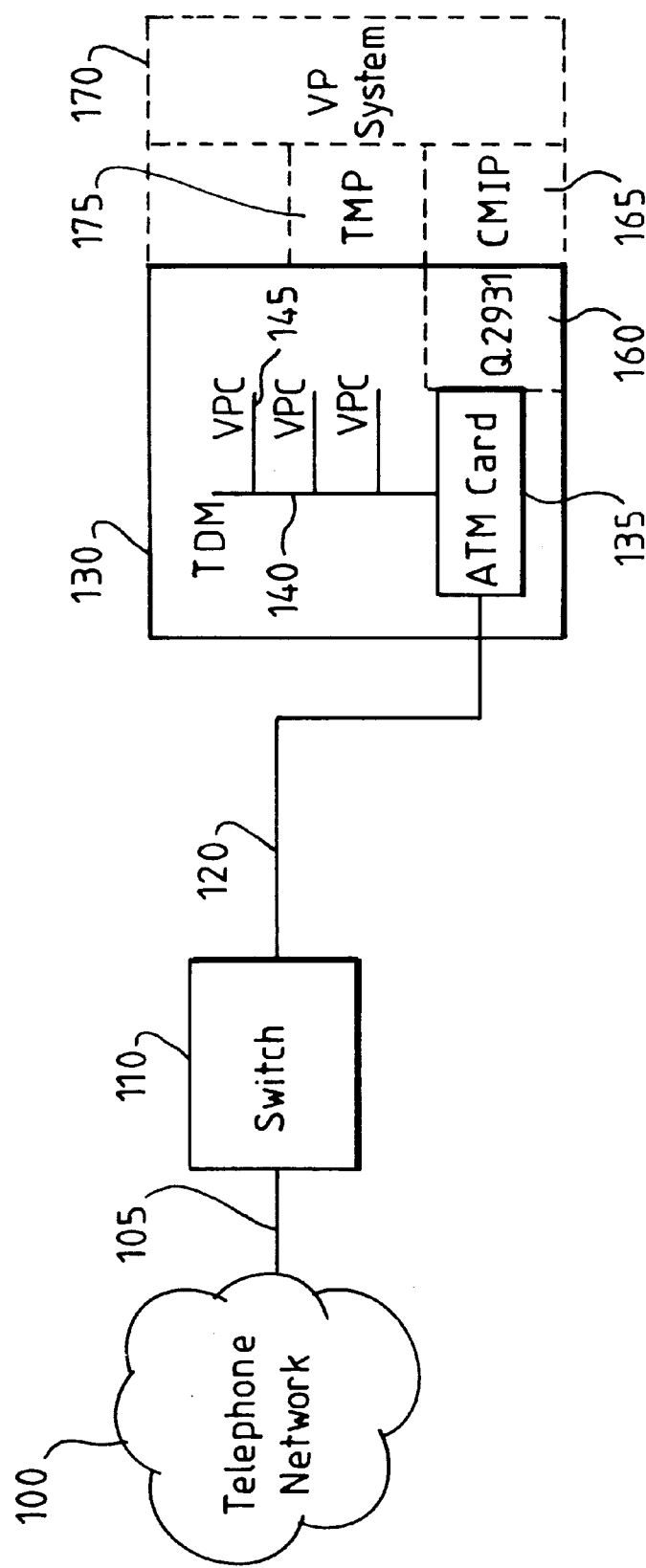
FIG. 4 illustrates a third preferred embodiment of the invention, whereby a voice processing system is connected to a switch by an ATM link, using SVCs and ATM signalling according to Q.2931.

FIG. 4 illustrates a further embodiment of the invention, this time involving switched virtual connections (SVCs) over the ATM link between the switch and the voice processing system. In order to implement SVCs, the ATM adapter card 135 is required to support the ATM signalling protocol known as Q.2931, shown schematically in FIG. 4 as software component 460 (the Q.2931 component corresponds to the layer 3 component in the OSI reference model). The switch must also support this protocol. The Q.2931 software will typically be resident on the ATM adapter card 135, and interface to the voice processing software 170 and associated application as appropriate, to receive outbound call requests and also to indicate incoming call events.

The operation of the embodiment of FIG. 4 is substantially similar to that for the embodiments of FIGS. 2 and 3, except for the signalling. Thus for example, when the switch receives an incoming call from the telephone network 100 intended for the voice processing system 130, it exchanges ATM signalling messages with the Q.2931 software component to set up a virtual connection between the switch and the adapter card over a particular virtual path and virtual circuit. The Q.2931 component informs the call manager program 165 of the incoming call, which in response requests a time slot on the TDM bus 140 from the time slot manager 175. The call manager program then informs the ATM adapter of the identity of the allocated time slot, allowing the ATM adapter to map data from the allocated time slot onto the new virtual connection, and vice versa. Note that if there were no free time slots available on the TDM bus 140 when the call is received, then the call would have to be rejected.

Outbound calls are handled in essentially analogous fashion. Thus the call manager requests a virtual connection from the ATM adapter card, resulting in negotiations between the Q.2931 software component 460 on the voice processing system and the switch to set up a new virtual connection between the voice processing system and the switch. The call manager also requests a time slot from the timeslot manager 175. The identity of the allocated time slot is then passed to the ATM adapter, again allowing the ATM adapter to map data from the allocated time slot onto the new virtual connection, and vice versa.

It will be appreciated that many of the possible variations discussed above with reference to FIGS. 2 and 3 are also applicable to the embodiment of FIG. 4.

Figure 5:
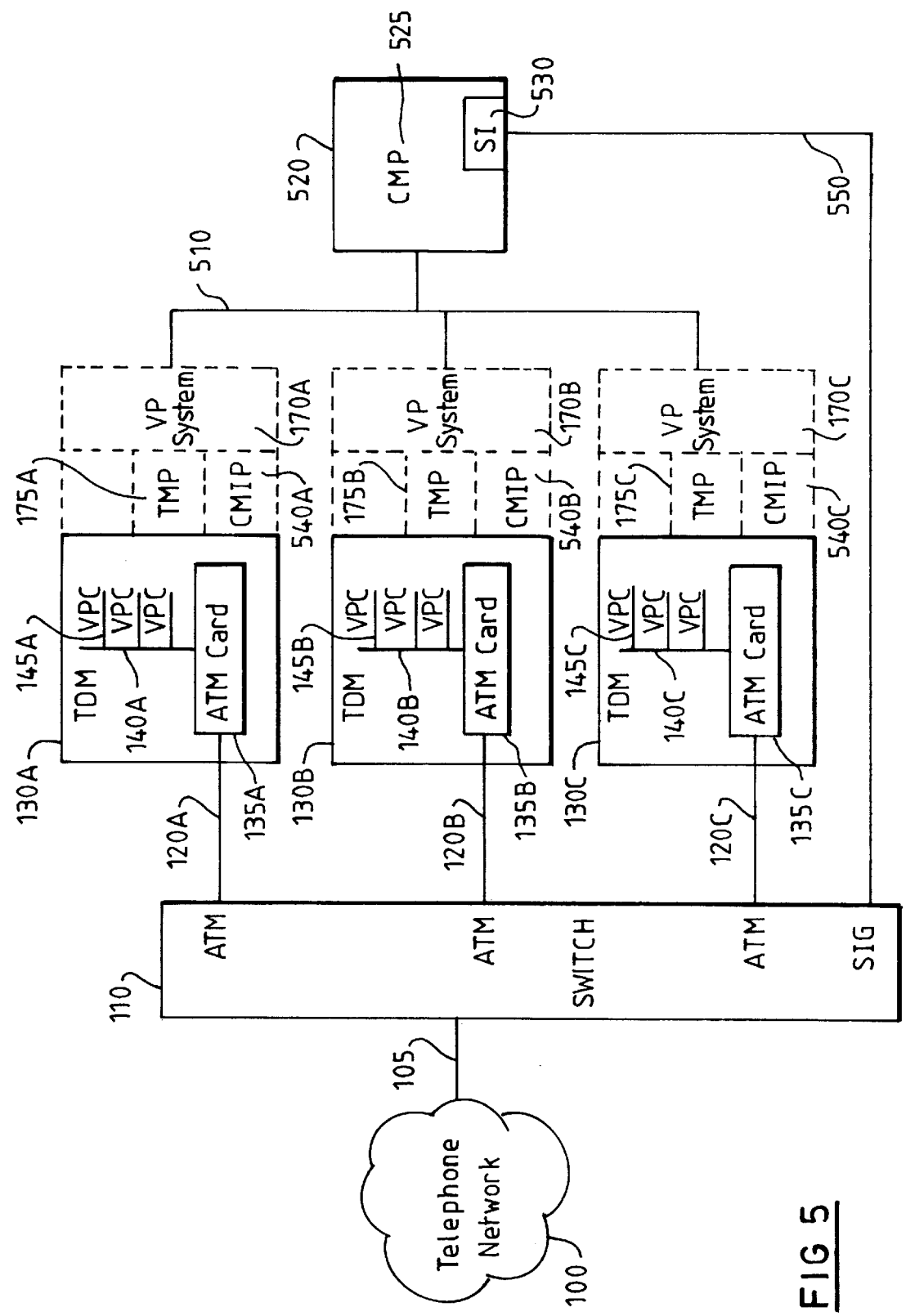
FIG. 5 illustrates a further preferred embodiment of the invention, whereby multiple voice processing systems are connected to a switch by an ATM link.

FIG. 5 shows another preferred embodiment of the invention. In this configuration, there are multiple voice processing systems 130A, 130B, 130C (three such systems are shown in FIG. 5, but this is purely by way of example). Each voice processing system has its own ATM link 120A, 120B, 120C to the switch 110. The main hardware components of each voice processing system are substantially as described with reference to FIGS. 2, 3 and 4. In particular, each voice processing system again has an ATM adapter card 135A, 135B, 135C, to terminate the respective ATM link to the switch, with the ATM adapter card also being connected to one or more voice processing cards 145A, 145B, 145C via a TDM bus 140A, 140B, 140C.

The embodiment of FIG. 5 also includes a call processor system 520, which firstly has a signalling connection 550 to the switch, and secondly is linked to the multiple voice processing systems via a local area network (LAN) 510. The signalling link 550 between the switch 110 and the call processor system 520 is typically a standard ISUP SS7 connection, or some form of proprietary link (as discussed with reference to FIG. 2). The call processor system 520 includes a call manager component 525, which effectively controls overall call processing amongst the different voice processing systems 130 and maintains an image of the whole configuration, and a signalling interface component 530 for exchanging signalling information with the switch over the signalling link 550. The call manager component 525 communicates over the LAN 510 with a call manager interface program 540A, 540B, 540C on each of the voice processing systems.

The operation of the installation of FIG. 5 will now be described. It is assumed that appropriate permanent virtual connections are configured over links 120A, 120B, 120C between the switch 110 and the voice processing systems 130A, 130B, 130C. Thus for outbound calls, the call manager system 520 sends a request to the call manager interface program 540 on a particular voice processing system, identifying a virtual connection between that voice processing system and the switch. It is assumed that in this embodiment, each virtual connection is pre-assigned to a particular timeslot on the relevant voice processing system. Therefore, in response to the call request from the call manager system 520, the call manager interface program 540 checks with the timeslot manager 175 whether or not the timeslot corresponding to the identified virtual connection is available. If the timeslot is not available, the system will refuse to make the call and respond appropriately to the call manager system 520. Assuming however that the relevant timeslot is available, the call manager interface program 540 returns a positive response to the call manager system 520, which sends an appropriate request to place an outgoing call to the switch over the signalling link 550. This request would identify the voice processing system and virtual connection to be used, to allow the switch to connect the outbound call as required (the request may contain this information per se, or the switch and voice processing system may maintain tables to map between virtual connection and channel/trunk numbers as previously mentioned).

Generally placement of an outbound call is initiated by an application (not shown) running in association with the voice processing software 170 on one of the voice processing systems (or on some other system, not shown), with the application sending a request over LAN 510 to the call manager system 520, which in turn leads to the request mentioned above from the call manager system 520 to the call manager interface program 540 on a particular voice processing system. In such circumstances, after the call manager system 520 has received notification from the switch over signalling link 550 that the outbound call has been successfully placed, the call manager system then notifies the application of this. The call manager also informs the voice processing card of the timeslot allocated to the call, thereby allowing the card to connect to the call.

For inbound calls, the switch 110 first of all notifies the call manager process 520 over link 550 of the existence of the incoming call, including an identification of the intended voice processing system and virtual connection for the call. The call manager process 520 then sends a request to the call manager interface program 540 on the relevant voice processing system. Responsive to this request, the call manager interface program interacts with the timeslot manager to determine if the timeslot corresponding to the intended virtual connection is available, and responds accordingly. The call manager process can then signal back to the switch, accepting the call if the intended timeslot is available (the call manager process may check first with an application before the call is accepted).

Finally, the switch connects the call to the appropriate virtual connection.

Although just one embodiment of this multiple voice processing system installation is described, the skilled person would recognise that this embodiment may be modified in a wide variety of ways. For example, although the call manager process 520 is shown as a separate system, it could in fact be incorporated into one of the voice processing systems (or distributed amongst them). Also, appropriate ATM connections could be used instead of the LAN 510 or the signalling link 550 (or both). Equally, the operation of the embodiment of FIG. 5 could also be modified in a wide variety of ways. For example, the allocation of timeslots to virtual connections could be dynamic rather than static, and switched virtual connections could be used instead of permanent virtual connections. For incoming calls, the call manager system 520 might be used instead of the switch to select a target voice processing system (based for example on workload, or ANI/DNIS information), with appropriate signalling information being exchanged between the switch and the call manager system. Many other such modifications will occur naturally to the skilled person.

In the preceding description the voice processing systems 130 have been used primarily for conventional telephony processing (including FAX). However, it will be appreciated that the same architecture may also be used for other media, or for combinations of media. For example the voice processing system could act as a video server, or process communications involved integrated voice and/or video and/or data. ATM switched virtual connections are particularly suited to such multimedia use since the bandwidth of a virtual channel can be set up as required. This provides a very flexible solution, since not only can 64 kbps conventional telephony calls be handled simply, but the system can be readily extend to higher bandwidth calls, such as integrated voice/data calls under the H.261 standard, or multimedia calls under the H.324 standard. By contrast, in order to handle such higher bandwidth calls using PVCS, it would be necessary to either pre-configure large channels, which would be inflexible and very inefficient if their full bandwidth was not always required, or combine multiple standard (eg 64 kbps channels) into one logical link. Having a single channel for such higher bandwidth calls is much simpler however than having to simultaneously use multiple smaller channels, and has lower processing and communications overheads. Therefore the use of SVCs is particularly beneficial when the voice processing system is being used for applications such as video conferencing, and/or integrated voice/video/data communications. Of course, it would also be desirable for the TDM bus to support flexible channel sizes, although alternatively two or more conventional 64 kbps timeslots could be grouped together for such video transmissions, with only modest changes required to the ATM adapter card.

What is claimed is:

1. A voice processing system for handling calls incoming or outgoing over an ATM link attached to a switch and supporting a plurality of virtual connections, said voice processing system comprising:

means for exchanging call signalling infoirmationAwith the switch;

a time division multiplex (TDM) bus having multiple timeslots;

adapter means; and at least one voice processing card for processing call data to perform a telephony functions;

wherein said adapter means includes first connector means for attaching to the ATM link to transfer call data between a virtual connection on the ATM link and the adapter means and second connector means for attaching to the TDM bus for transferring data between the adapter means and one or more timeslots on the TDM bus;

and said at least one voice processing card includes connector means for attaching to the TDM bus for extracting call data from a timeslot on the TDM bus;

whereby call data incoming over said ATM link is passed through the adapter means onto the TDM bus and then from the TDM bus to the voice processing card.

2. The voice processing system of claim 1, wherein each virtual connection is pre-assigned to said one or more timeslots on the TDM bus.

3. The voice processing system of claim 1, wherein a virtual connection is assigned to said one or more timeslots on the TDM bus responsive to each call.

4. The voice processing system of claim 1, wherein said signalling information is exchanged over a separate link from said ATM link.

5. The voice processing system of claim 1, wherein said signalling information is exchanged over said ATM link.

6. The voice processing system of claim 1, wherein said plurality of virtual connections comprise permanent virtual connections.

7. The voice processing system of claim 5, wherein said plurality of virtual connections comprise switched virtual connections.

8. The voice processing system of claim 7, wherein at least two different ones of said switched virtual connections have different bandwidths.

9. The voice processing system of claim 8, wherein said voice processing system includes means for transmitting and/or receiving a FAX, integrated voice/data, or video signal via said ATM link.

10. The voice processing system of claim 1, wherein said voice processing system includes means for transmitting and/or receiving a FAX, integrated voice/data or video signal via said ATM link.

11. The voice processing system of claim 1, further comprising at least one voice processing card, said card including means for recognising DTMF signals.

12. The voice processing system of claim 1, wherein said plurality of virtual connections comprise permanent virtual connections.

13. A method for handling calls in a voice processing system, said calls incoming or outgoing over an ATM link attached to a switch and supporting a plurality of virtual connections, comprising the steps of:

exchanging call signalling information with the switch;

receiving incoming telephony data from said calls from a virtual connection on said ATM link;

transferring said incoming telephony data onto a time division multiplex (TDM) bus having multiple timeslots via an adapter card;

extracting the incoming telephony data from a timeslot on the TDM bus onto a voice processing card;

processing said extracted telephony data on the voice processing card to perform a telephony function;

generating outgoing telephony data for said calls;

placing said outgoing telephony data onto a timeslot on the TDM bus; and transferring said outgoing telephony data from said timeslot on the TDM bus onto a virtual connection on the ATM link via said adapter card.

14. The method of claim 13, further comprising the initial steps of:

receiving an incoming telephony call at said switch;

selecting one or more virtual connections over said ATM link between the switch and the voice processing system;

wherein said incoming and outgoing telephony data are transferred over said one or more selected virtual connections.

15. The method of claim 14, wherein said step of selecting a virtual connection comprises the steps of:

determining at the switch one or more available virtual connections for use for the incoming call from a set of permanent virtual connections between the switch and the voice processing system; and transmitting the identity of each determined virtual connection from the switch to the voice processing system as call signalling information.

16. The method of claim 15, wherein the identity of each determined virtual connection is transmitted from the switch to the voice processing system as a channel and trunk identifier over a signalling link separate from said ATM link in accordance with a standard signalling protocol.

17. The method of claim 16, further comprising the voice processing system performing a mapping between the channel and trunk identifier supplied in accordance with the standard signalling protocol and the determined virtual connection.

18. A voice processing installation for handling incoming and/or outgoing calls, comprising:

a switch;

a voice processing system;

an ATM link connecting said switch to said voice processing system, said ATM link supporting a plurality of virtual connections between the switch and the voice processing system and means for exchanging call signalling information between the switch and the voice processing system;

a time division multiplex (TDM) bus in said voice processing system having multiple timeslots;

adapter means including first connector means for attaching to the ATM link to transfer call data between a virtual connection on the ATM link and the adapter means, and second connector means for attaching to the TDM bus for transferring data between the adapter means and one or more timeslots on the TDM bus; and at least one voice processing card attached to the TDM bus and capable of extracting call data from a timeslot on the TDM bus and processing said extracted call data to perform a telephony function;

whereby call data incoming over said ATM link is passed through the adapter means onto the TDM bus and then from the TDM bus to the voice processing card.

19. A voice processing installation for handling incoming and/or outgoing calls, comprising:

a switch;

a plurality of voice processing systems, each attached to said switch by a respective ATM link supporting a plurality of virtual connections between the switch and the voice processing system;

each voice processing system further comprising a time division multiplex (TDM) bus having multiple timeslots; adapter means including first connector means for attaching to the ATM link to transfer call data between a virtual connection on the ATM link and the adapter means, and second connector means for attaching to the TDM bus for transferring data between the adapter means and one or more timeslots on the TDM bus; and at least one voice processing card attached to the TDM bus, capable of extracting call data from a timeslot on the TDM bus and processing said extracted call data to perform a telephony function, whereby call data incoming over said ATM link is passed through the adapter means onto the TDM bus and then from the TDM bus to the voice processing card.

* * * * *

UNITED STATES PATENT AND TRADEMARK OFFICE
CERTIFICATE OF CORRECTION

PATENT NO. : 6,205,134 B1
DATED : March 20, 2001
INVENTOR(S) : Robert M. Jordan, et al.

It is certified that error appears in the above-identified patent and that said Letters Patent is hereby corrected as shown below:

<u>Column 13,</u>
Line 64, replace "infoirmationAwith" with -- information with --.

Signed and Sealed this

Sixteenth Day of October, 2001

Attest:

NICHOLAS P. GODICI
*Attesting Officer*    *Acting Director of the United States Patent and Trademark Office*